(12) United States Patent　(10) Patent No.: US 11,098,628 B2
Hirose　(45) Date of Patent: Aug. 24, 2021

(54) CLOGGING DETERMINATION DEVICE

(71) Applicant: FUJITSU LIMITED, Kawasaki (JP)

(72) Inventor: Tatsuya Hirose, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 485 days.

(21) Appl. No.: 16/224,872

(22) Filed: Dec. 19, 2018

(65) Prior Publication Data

US 2019/0211735 A1　Jul. 11, 2019

(30) Foreign Application Priority Data

Jan. 11, 2018　(JP) .............................. JP2018-002820

(51) Int. Cl.
| | |
|---|---|
| *F01N 9/00* | (2006.01) |
| *G01N 15/06* | (2006.01) |
| *G01N 22/00* | (2006.01) |
| *F01N 11/00* | (2006.01) |
| *F01N 3/021* | (2006.01) |
| *G01N 15/00* | (2006.01) |

(Continued)

(52) U.S. Cl.
CPC ............. *F01N 9/002* (2013.01); *F01N 3/021* (2013.01); *F01N 11/00* (2013.01); *G01N 15/0643* (2013.01); *G01N 22/00* (2013.01); *B01D 46/0086* (2013.01); *B01D 2273/18* (2013.01); *F01N 2240/05* (2013.01); *F01N 2560/12* (2013.01); *F01N 2900/0422* (2013.01); *F01N 2900/1606* (2013.01); *G01N 2015/0046* (2013.01); *G01N 2015/084* (2013.01)

(58) Field of Classification Search
CPC ......... F01N 9/00–002; F01N 3/02–021; F01N 11/00; F01N 2240/05; F01N 2560/00; F01N 2560/12; F01N 2900/0422; F01N 2900/16–1606; G01N 15/0042; G01N 15/0046; G01N 15/0643; G01N 15/0656; G01N 22/00; G01N 2015/0046; G01N 2015/084; G01N 2015/0846; B01D 46/0084–0086; B01D 2273/00; B01D 2273/18; B01D 2273/22

USPC ...................................................... 324/637
See application file for complete search history.

(56) References Cited

U.S. PATENT DOCUMENTS

| | | | | |
|---|---|---|---|---|
| 9,400,297 | B2 * | 7/2016 | Bromberg ............... | G01N 22/00 |
| 10,775,327 | B2 * | 9/2020 | Chennupati ........... | F01N 11/007 |
| 2012/0017570 | A1 * | 1/2012 | Kulkarni ............... | F01N 3/0232 |
| | | | | 60/277 |

FOREIGN PATENT DOCUMENTS

| | | |
|---|---|---|
| JP | 2011-58374 A | 3/2011 |
| JP | 2011-137445 A | 7/2011 |

\* cited by examiner

*Primary Examiner* — Melissa J Koval
*Assistant Examiner* — Rahul Maini
(74) *Attorney, Agent, or Firm* — Fujitsu Patent Center

(57) ABSTRACT

A clogging determination device includes a first antenna disposed at one of a side of a first end and a side of a second end of a filter disposed internally of a case, a second antenna disposed at the other of the side of the first end and the side of the second end of the filter, a multi-tone signal generator that has an output terminal coupled to the first antenna, outputs from the output terminal a multi-tone signal obtained by compositing a plurality of signals having different frequencies, and moves a position of an envelope of the multi-tone signal emitted to the filter from the first antenna, a detector that is coupled to the second antenna, and detects an intensity of the multi-tone signal received by the (Continued)

second antenna, and a determinator that determines a degree of clogging of the filter based on an intensity of the multi-tone signal.

11 Claims, 14 Drawing Sheets

(51) Int. Cl.
*G01N 15/08* (2006.01)
*B01D 46/00* (2006.01)

FIG. 5

| COLLECTION TIMING | VOLTAGE DATA |
|---|---|
| FIRST TIME | V1 |
| SECOND TIME | V2 |
| ⋮ | ⋮ |
| 11TH TIME | V11 |

COLLECTION START POSITION: END 12A
COLLECTION COMPLETION POSITION: END 12B

POSITION

CLOGGING DETERMINATION DEVICE

CROSS-REFERENCE TO RELATED APPLICATION

This application is based upon and claims the benefit of priority of the prior Japanese Patent Application No. 2018-2820, filed on Jan. 11, 2018, the entire contents of which are incorporated herein by reference.

FIELD

The embodiments discussed herein are related to a clogging determination device.

BACKGROUND

Conventionally, an accumulated particulate matter amount detection device is known, the accumulated particulate matter amount detection device that uses a filter that catches particulate matter from a gas containing the particulate matter, a container that houses the filter, multiple transmitting units that irradiate multiple different areas of the filter with electromagnetic waves having a frequency of 30 GHz to 10 THz, and multiple receiving units that receive the electromagnetic waves which have passed through the multiple areas. The detection device detects spatial distribution of the amount of particulate matter caught in the filter based on the intensity of the electromagnetic waves received by the multiple receiving units.

The accumulated particulate matter amount detection device in related art has a complicated configuration because the multiple transmitting units and the multiple receiving units are used for the multiple different areas of the filter.

The following is a reference document.
[Document 1] Japanese Laid-open Patent Publication No. 2011-137445.

SUMMARY

According to an aspect of the embodiments, a clogging determination device includes a first antenna disposed at one of a side of a first end and a side of a second end of a filter disposed internally of a case which serves as a flow path for an exhaust gas, a second antenna disposed at the other of the side of the first end and the side of the second end of the filter, a multi-tone signal generator that has an output terminal coupled to the first antenna, outputs from the output terminal a multi-tone signal obtained by compositing a plurality of signals having different frequencies, and moves a position of an envelope of the multi-tone signal emitted to the filter from the first antenna, in a direction of the flow path in the filter by changing a phase or a frequency of at least one of the plurality of signals, a detector that is coupled to the second antenna, and detects an intensity of the multi-tone signal received by the second antenna, and a determinator that determines a degree of clogging of the filter based on an intensity of the multi-tone signal outputted from the first antenna and the intensity of the multi-tone signal detected by the detector.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 5 is a table illustrating the voltage data and data representing collection timings stored in an internal memory by a data collection unit;

DESCRIPTION OF EMBODIMENTS

Hereinafter, a clogging determination device according to an embodiment will be described.

First Embodiment

Figure 1A:
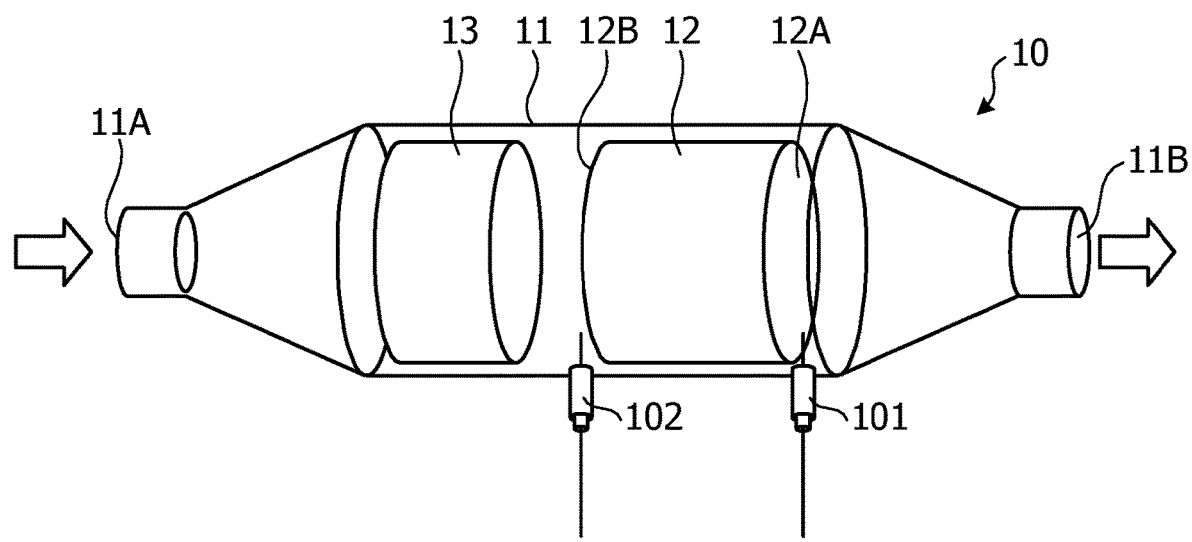
FIGS. 1A and 1B are views illustrating a filter device.
Figure 1B:
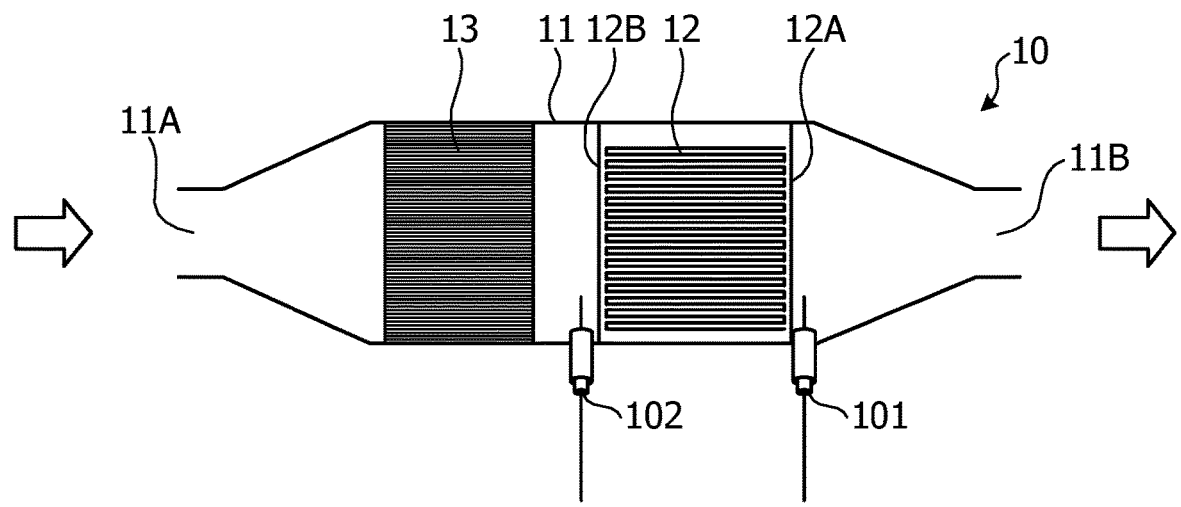

FIGS. 1A and 1B are views illustrating a filter device 10. FIG. 1A illustrates a transparent perspective view of the internal structure of the filter device 10, and FIG. 1B illustrates a cross-sectional structure of the filter device 10.

The filter device 10 includes a case 11, a filter 12, and an oxidation catalyst 13. The filter device 10 includes antennas 101, 102. As an example, the filter device 10 is mounted in a vehicle equipped with a diesel engine to purify the exhaust gas of the diesel engine. The filter device 10 is inserted in series into an exhaust pipe for discharging the exhaust gas of the diesel engine.

The case 11 is a cylindrical metal case which is part of the exhaust pipe for discharging the exhaust gas of the diesel engine. The case 11 has an introduction inlet 11A and a discharge outlet 11B. The exhaust gas is exhausted from the diesel engine, flows into the inside of the case 11 through the introduction inlet 11A, and is discharged through the discharge outlet 11B. The filter 12, the oxidation catalyst 13, and the antennas 101, 102 are disposed inside the case 11.

The filter 12 is a diesel particulate filter (DPF) disposed in the case 11, and a cylindrical porous member made of ceramics. The filter 12 is composed of, for instance, ceramics made of cordierite. The cordierite has such properties that it hardly absorbs microwave.

The filter 12 has an end 12A and an end 12B. The end 12A is located in on the exhaust side (downstream side), and the end 12B is located on the inlet side (upstream side). The filter 12 catches the particulate matter contained in the exhaust gas which flows through the end 12B. The end 12A is an example of a first end, and the end 12B is an example of a second end.

The oxidation catalyst 13 is a diesel oxidation catalyst (DOC) that is a device which is disposed on the upstream side of the filter 12 in the case 11, and oxidizes the hydrocarbon contained in the exhaust gas exhausted from the diesel engine to increase the exhaust gas temperature.

The antennas 101, 102 are disposed on the downstream and upstream side, respectively of the filter 12 in the case 11. The antenna 101 is an example of a first antenna, and the antenna 102 is an example of a second antenna.

The antenna 101 emits a two-tone signal to the inside of the case 11, and the antenna 102 receives a two-tone signal inside the case 11.

Figure 2:
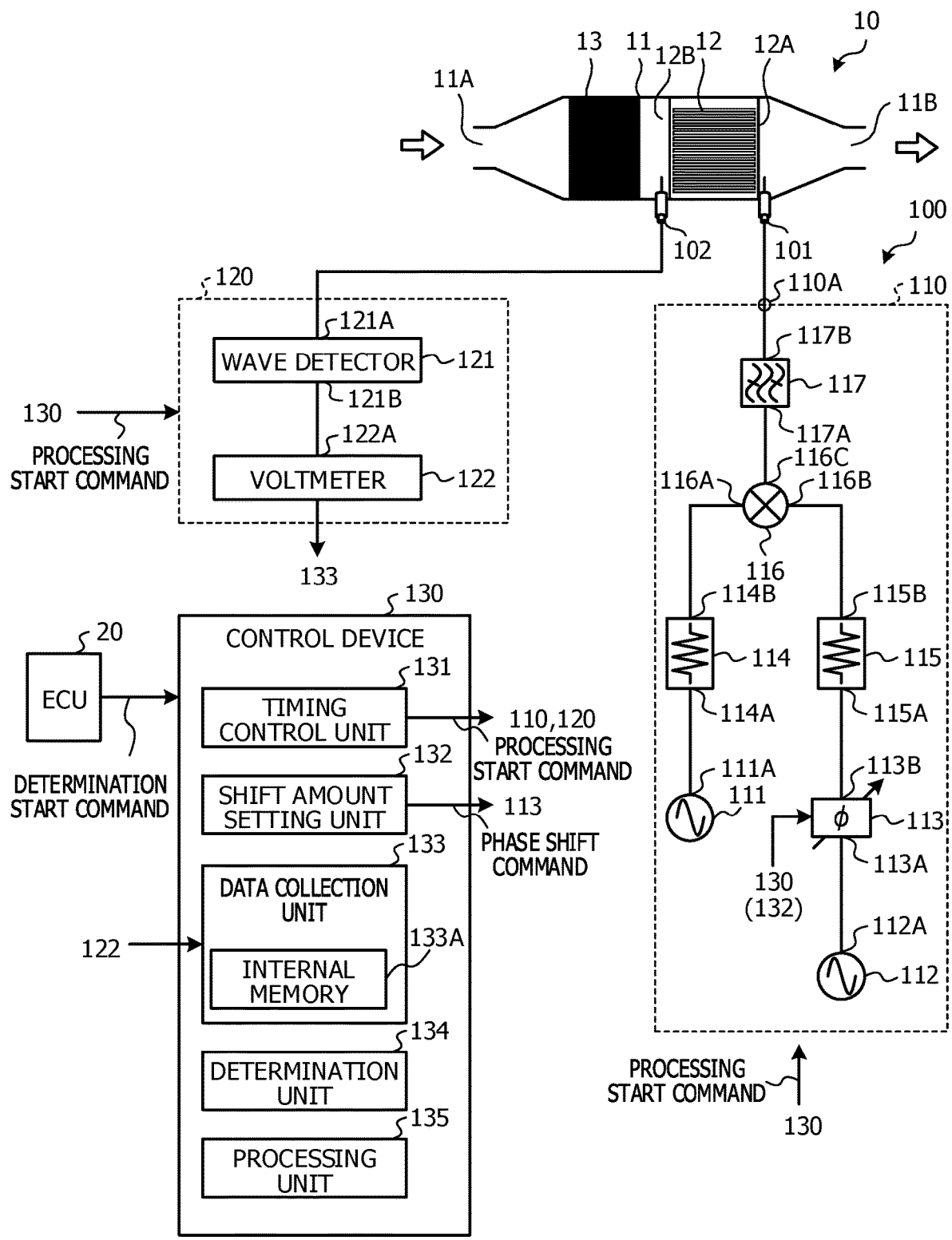
FIG. 2 is a diagram illustrating a clogging determination device, a filter device, and an ECU in a first embodiment.

FIG. 2 is a diagram illustrating a clogging determination device 100, a filter device 10, and an electronic control unit (ECU) 20 in a first embodiment. The clogging determination device 100 is mounted in a vehicle equipped with the filter device 10 and the ECU 20.

The clogging determination device 100 includes the antennas 101, 102, a signal generation unit 110, a detection device 120, and a control device 130.

The signal generation unit 110 includes an output terminal 110A, oscillators 111, 112, a phase shifter 113, attenuation units 114, 115, a mixer 116, and a band pass filter (BPF) 117. When a processing start command is inputted from the control device 130, the signal generation unit 110 generates a two-tone signal, in which two signals having different frequencies are composited, and outputs the two-tone signal from the output terminal 110A. The processing start command is a command by which the control device 130 instructs a predetermined component of the clogging determination device 100 to start measurement of clogging of the filter 12.

The signal generation unit 110 is an example of a multi-tone signal generation unit. The first embodiment will be described where a two-tone signal is used as an example of a multi-tone signal. A multi-tone signal is a signal having multiple tones, which is obtained by compositing two or more signals having different frequencies.

The output terminal 110A is connected to the output terminal of the BPF 117 in the inside of the signal generation unit 110, and is connected to the antenna 101 on the outside of the signal generation unit 110.

The oscillator 111 oscillates a microwave signal with a frequency f1 in 2.45 GHz band. The 2.45 GHz band is a predetermined frequency band around 2.45 GHz defined in Industrial, Scientific, and Medical (ISM) radio bands, and the frequency f1 is one of the frequencies contained in the 2.45 GHz band.

The microwave signal oscillated by the oscillator 111 is one of two signals having different frequencies used to generate a two-tone signal. An output terminal 111A of the oscillator 111 is connected to an input terminal 114A of the attenuation unit 114. The oscillator 111 is an example of a first oscillator, and the frequency f1 is an example of a first frequency. The detailed configuration of the oscillator 111 will be described later with reference to FIGS. 6 and 7.

The oscillator 112 oscillates a microwave signal with a frequency f2 in 2.45 GHz band. The frequency f2 is one of the frequencies contained in the 2.45 GHz band, and is different from the frequency f1. The microwave signal oscillated by the oscillator 112 is one of the two signals having different frequencies used to generate a two-tone signal. The frequency f2 is higher than the frequency f1 by a frequency $\Delta f$.

An output terminal 112A of the oscillator 112 is connected to an input terminal 113A of the phase shifter 113. The oscillator 112 is an example of a second oscillator, and the frequency f2 is an example of a second frequency. The detailed configuration of the oscillator 112 will be described later with reference to FIGS. 6 and 7.

The phase shifter 113 has the input terminal 113A and an output terminal 113B. The input terminal 113A is connected to the output terminal 112A of the oscillator 112, and the output terminal 113B is connected to an input terminal 115A of the attenuation unit 115.

The phase shifter 113 is implemented by, for instance, a phase shifter, and is an example of a phase shift unit. The phase shifter 113 shifts the phase of the microwave signal outputted from the oscillator 112, and outputs the microwave signal to the attenuation unit 115.

The amount of phase shift applied to the microwave signal with the frequency f2 by the phase shifter 113 is set by the control device 130.

The attenuation unit 114 has the input terminal 114A and an output terminal 114B. The input terminal 114A is connected to the output terminal 111A of the oscillator 111, and the output terminal 114B is connected to an input terminal 116A of the mixer 116.

The attenuation unit 114 is provided to attenuate the signal level of a microwave signal oscillated by the oscillator 111 to a predetermined appropriate level, as well as to terminate the characteristic impedance between the oscillator 111 and the mixer 116 to 50$\Omega$. The attenuation unit 114 is, for instance, an attenuator.

The attenuation unit 115 has the input terminal 115A and an output terminal 115B. The input terminal 115A is connected to the output terminal 113B of the phase shifter 113, and the output terminal 115B is connected to an input terminal 116B of the mixer 116.

The attenuation unit 115 is provided to attenuate the signal level of a microwave signal oscillated by the oscillator 112 to a predetermined appropriate level, as well as to terminate the characteristic impedance between the phase shifter 113 and the mixer 116 to 50$\Omega$, the microwave signal having a phase shifted by the phase shifter 113. The attenuation unit 115 is, for instance, an attenuator.

The mixer 116 has the input terminals 116A and 116B, and an output terminal 116C. The input terminals 116A and 116B are connected to the output terminals 114B and 115B of the attenuation units 114 and 115, respectively. The output terminal 116C is connected to an input terminal 117A of the BPF 117.

The mixer 116 mixes a microwave signal with the frequency f1 inputted via the attenuation unit 114, and a microwave signal with the frequency f2 inputted via the attenuation unit 115, and outputs the mixed signal to the BPF 117. The signals mixed by the mixer 116 includes a two-tone signal in 2.45 GHz band.

The BPF 117 has the input terminal 117A and an output terminal 117B. The input terminal 117A is connected to the output terminal 116C of the mixer 116, and the output terminal 117B is connected to the antenna 101.

The BPF 117 has a passband which removes spurious noise from the signal inputted by the mixer 116 and allows the two-tone signal to pass through. The passband of the BPF 117 is a predetermined band in 2.45 GHz band. The predetermined band contains the band of a two-tone signal in 2.45 GHz band, the two-tone signal being generated by mixing a microwave signal with the frequency f1 and a microwave signal with the frequency f2.

The signal generation unit 110 as described above moves the peak position of the envelope of the two-tone signal emitted to the filter 12 from the antenna 101 in an axial direction (direction connecting the end 12A and the end 12B) in the filter 12 by changing one of the phases of the two signals. The axial direction of the filter 12 is the direction (flow path direction) in which the exhaust gas flows in the filter 12.

In the first embodiment, the signal generation unit 110 intermittently moves the peak position of the envelope from the end 12A of the filter 12 to the end 12B. The reason why the peak position of the envelope is moved in this manner is as follows.

Since the intensity of the two-tone signal is the highest at the peak position of the envelope, when it is determined whether clogging has occurred in the filter 12, the signal level of the two-tone signal received by the antenna 102 is to be detected with the peak of the envelope moved to a position at which determination is made.

The filter 12 has a length of approximately 100 mm in the axial direction, thus an occurrence of clogging is determined with the filter 12 divided into multiple portions in the axial direction. Thus, for instance, portions, at which determination is made, are set at 10 mm intervals in the axial direction.

When multiple peaks are present in the axial direction of the filter 12, determination is difficult because at least one peak is present other than the position at which determination is made. For this reason, the frequency of the envelope is adjusted so that one peak is present between the end 12A and the end 12B in the axial direction of the filter 12.

The detection device 120 has the wave detector 121 and a voltmeter 122. When a processing start command is inputted from the control device 130, the detection device 120 detects the signal level of a two-tone signal received by the antenna 102. The detection device 120 is an example of a detection unit.

The wave detector 121 has an input terminal 121A and an output terminal 121B. The input terminal 121A is connected to the antenna 102, and the output terminal 121B is connected to an input terminal 122A of the voltmeter 122.

The wave detector 121 detects the envelope of the two-tone signal received by the antenna 102. Data representing the envelope of the two-tone signal detected by the wave detector 121 is inputted to the voltmeter 122.

The voltmeter 122 measures the signal level (voltage value) of the envelope from the data representing the envelope of the two-tone signal detected by the wave detector 121. Voltage data representing the voltage value measured by the voltmeter 122 is inputted to a data collection unit 133 of the control device 130.

The control device 130 has a timing control unit 131, a shift amount setting unit 132, the data collection unit 133, a determination unit 134, and a processing unit 135. When a determination start command is inputted from the ECU 20, the control device 130 starts processing to determine a degree of clogging of the filter 12. The ECU 20 is mounted in a vehicle equipped with the filter device 10 to overall control resume processing for the filter device 10. The determination start command is a command by which the ECU 20 instructs the clogging determination device 100 to start measurement of clogging of the filter 12.

When a determination start command is inputted from the ECU 20, the timing control unit 131 transmits a processing start command to the signal generation unit 110, the detection device 120, the shift amount setting unit 132, and the data collection unit 133 to start the processing. Each time a predetermined time elapses since the transmission of the processing start command, the timing control unit 131 transmits an output command for outputting a phase shift command to the shift amount setting unit 132 as well as a collection command for collecting voltage data to the data collection unit 133.

When a processing start command is received or an output command is received from the timing control unit 131, the shift amount setting unit 132 outputs a phase shift command to the phase shifter 113. The phase shift command is a command to instruct the phase shifter 113 to shift the phase of a microwave signal.

When receiving a processing start command, the shift amount setting unit 132 outputs a phase shift command to the phase shifter 113, the phase shift command for shifting the peak of the envelope of the two-tone signal to the phase located at the end 12A of the filter 12.

When receiving an output command, the shift amount setting unit 132 outputs a phase shift command to the phase shifter 113, the phase shift command for intermittently moving the peak position of the envelope of the two-tone signal from the end 12A to the end 12B of the filter 12 at a fixed interval in a predetermined measurement period.

When a processing start command is received or a collection command is received from the timing control unit 131, the data collection unit 133 collects voltage data representing the voltage value measured by the voltmeter 122. The data collection unit 133 collects voltage data multiple times at a fixed time interval in a predetermined measurement period in accordance with the processing start command and the collection command.

The predetermined measurement period, in which the data collection unit 133 collects voltage data, is equal to the predetermined measurement period, in which the shift amount setting unit 132 outputs a phase shift command to the phase shifter 113, both the start time and the end time are equal.

The data collection unit 133 has an internal memory 133A, and stores collected voltage data in the internal memory 133A in time-series in association with data representing timing of collection.

The determination unit 134 reads the voltage data stored in time-series in the internal memory 133A of the data collection unit 133, and compares the voltage value represented by the voltage data with a predetermined threshold to determine whether clogging has occurred in the filter 12. Since the voltage data is collected multiple times at fixed timing in a predetermined measurement period, it is possible to determine the position, at which the voltage data is collected, between the end 12A and the end 12B of the filter 12 by identifying the chronological order of collection of the voltage data since the start of collection.

When determination processing of clogging by the determination unit 134 is completed, and occurrence of clogging and the position of the clogging is identified, the processing unit 135 performs resume processing for the filter 12. For example, the processing unit 135 increases the output of the oscillators 111 and 112 to break down the particulate matter which causes the clogging with the amount of phase shift applied by the phase shifter 113 adjusted so that the peak of the two-tone signal is located at the identified position.

Figure 3:
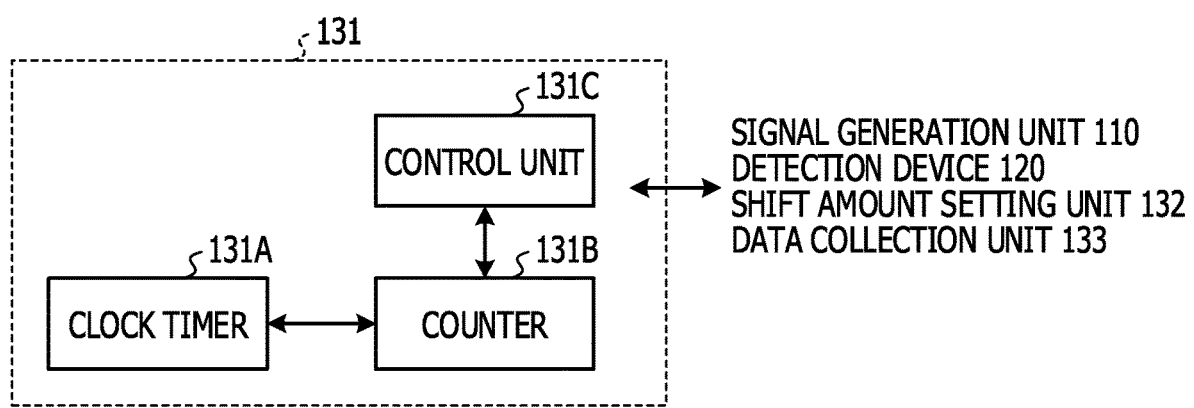
FIG. 3 is a diagram illustrating the configuration of a timing control unit.

FIG. 3 is a diagram illustrating the configuration of the timing control unit 131. The timing control unit 131 has a dock timer 131A, a counter 131B, and a control unit 131C.

The dock timer 131A outputs a dock having a predetermined frequency counted by the counter 131B. For instance, a dock oscillator may be used as the clock timer 131A.

The counter 131B is a counter that counts a dock outputted by the dock timer 131A. For instance, when a determination start command is inputted from the ECU 20 to the control unit 131C of the timing control unit 131, and the control unit 131C outputs a processing start command, the counter 131B counts the time elapsed since the output of the processing start command.

When a determination start command is inputted from the ECU 20, the control unit 131C outputs a processing start command to the signal generation unit 110, the detection device 120, the shift amount setting unit 132, and the data collection unit 133 as well as causes the counter 131B to start counting an elapsed time.

The control unit 131C refers to the elapsed time counted by the counter 131B, and each time a predetermined time is counted by the counter 131B, the control unit 131C causes the shift amount setting unit 132 to output a phase shift command as well as causes the data collection unit 133 to collect voltage data. Consequently, the voltage data collected over a predetermined measurement period, and data representing the timing of collection of the voltage data are stored in time-series in association with each other in the internal memory 133A of the data collection unit 133.

The predetermined measurement period is a period in which measurement of clogging of the filter 12 is performed. The predetermined time represents a time interval when voltage data is collected multiple times at the fixed time interval in the predetermined measurement period.

For instance, the predetermined measurement period is 10 minutes, and the predetermined time (time interval) is 1 minute. This is an exemplary time when measurement processing is performed at 11 positions between the end 12A to the end 12B inclusively of the filter 12.

After voltage data and data representing the timing of collection of the voltage data are stored in the internal memory 133A of the data collection unit 133, the determination unit 134 performs determination processing.

Figure 4:
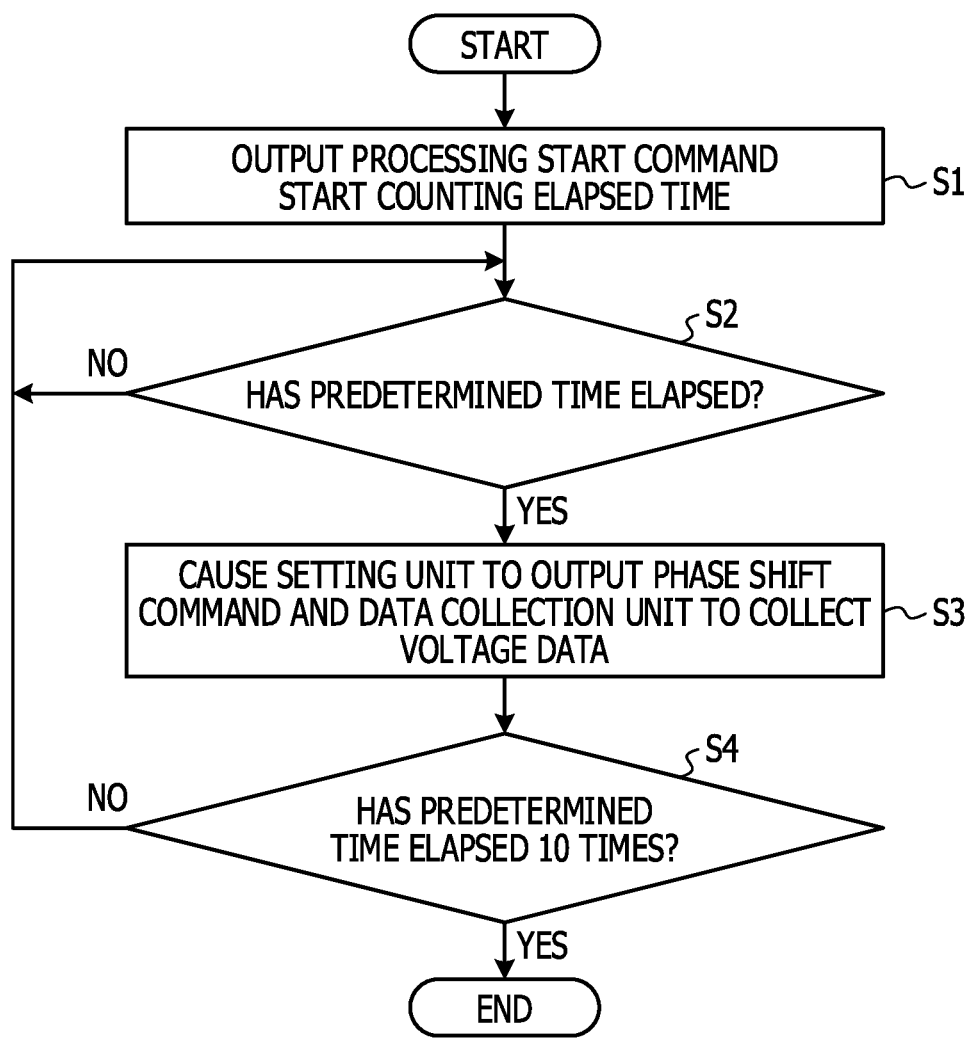
FIG. 4 is a flowchart illustrating the processing performed by a control unit of the timing control unit.

FIG. 4 is a flowchart illustrating the processing performed by the control unit 131C of the timing control unit 131.

When a determination start command is inputted from the ECU 20, the control unit 131C starts the processing (start).

The control unit 131C outputs a processing start command to the signal generation unit 110, the detection device 120, the shift amount setting unit 132, and the data collection unit 133 as well as causes the counter 131B to start counting an elapsed time (step S1). The output of the processing start command causes the signal generation unit 110 to output a two-tone signal, the detection device 120 to detect the signal level of the two-tone signal, the shift amount setting unit 132 to output a phase shift command, and the data collection unit 133 to collect voltage data.

The control unit 131C refers to the elapsed time counted by the counter 131B, and determines whether a predetermined time has elapsed (step S2). When determination processing in step S2 is performed for the first time, the processing to determine whether a predetermined time has elapsed actually determines whether a predetermined time has elapsed since the start of counting, and when determination processing in step S2 is performed for the second time and after, the processing actually determines whether a predetermined time has elapsed since the previous determination processing in step S2.

When determining that a predetermined time has elapsed (YES in S2), the control unit 131C causes the shift amount setting unit 132 to output a phase shift command as well as causes the data collection unit 133 to collect voltage data (step S3).

The control unit 131C determines whether the number of times when a predetermined time has elapsed has reached 10 times (step S4). This is because when a predetermined time has elapsed 10 times, the end of a predetermined measurement period is reached, and thus a series of processing is to be completed.

When determining that the number of times when a predetermined time has elapsed has reached 10 times (YES in S4), the control unit 131C completes a series of processing (end).

When determining in step S2 that a predetermined time has not elapsed (NO in S2), the control unit 131C repeatedly performs the processing in step S2. Step S2 is the processing which is repeatedly performed until a predetermined time elapses.

When determining in step S4 that the number of times when a predetermined time has elapsed has not reached 10 times (NO in S4), the control unit 131C returns the flow to step S2. This is because a predetermined time is counted again. Thus, the processing in step S2 is repeatedly performed until a predetermined time elapses 10 times.

FIG. 5 is a table illustrating the voltage data and data representing collection timings stored in the internal memory 133A by the data collection unit 133.

Each collection timing indicates chronological order of collection of the voltage data since the start of collection. In the first embodiment, as an example, the predetermined measurement period is 10 minutes, and the predetermined time (time interval) is 1 minute. Thus, the voltage data is collected 11 times.

As illustrated in FIG. 5, the data collection unit 133 stores voltage data V1 to V11 collected at collection timings 11 times in the internal memory 133A in time-series in association with the data representing the collection timings.

The position, at which collection of voltage data is started, is the end 12A of the filter 12, and the position, at which collection of voltage data is completed, is the end 12B of the fitter 12.

Figure 6:
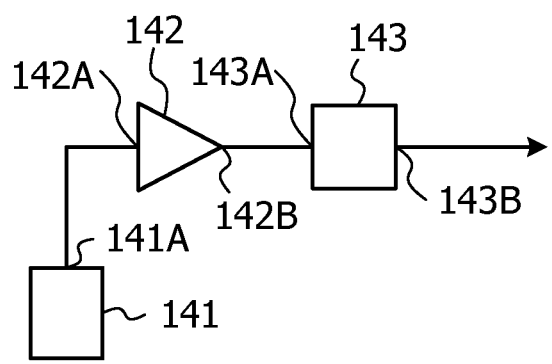
FIG. 6 is a diagram illustrating the configuration of an oscillator.

FIG. 6 is a diagram illustrating the configuration of the oscillator 111. Since the oscillators 111 and 112 have the same configuration, the oscillator 111 will be described. The oscillator 111 has a resonator 141, a negative resistive element 142, and a matching device 143.

The resonator 141 is a microwave resonator that produces resonance of a microwave signal with the frequency f1, and for instance, a cylindrical hollow resonator may be used. The resonator 141 preferably has a significantly high Q value. The resonator 141 outputs from the output terminal 141A a microwave signal, which resonates at the frequency f1, to the negative resistive element 142.

The negative resistive element 142 has an input terminal 142A and an output terminal 142B. The negative resistive element 142 is an element having a negative (minus) apparent resistance for a voltage inputted to the input terminal 142A, and is implemented by a negative impedance converter (NIC). The negative resistive element 142 oscillates a microwave signal which resonates at the frequency f1 in the resonator 141. The specific configuration of the negative resistive element 142 will be described later with reference to FIG. 7.

The matching device 143 has an input terminal 143A and an output terminal 143B. The input terminal 143A is connected to the output terminal 142B of the negative resistive element 142, and as the output terminal 111A of the oscillator 111, the output terminal 143B is connected to the input terminal 114A of the attenuation unit 114.

The matching device 143 is a circuit that terminates the characteristic impedance of the output terminal 111A of the oscillator 111 to 50Ω, and achieves impedance matching to enable the oscillator 111 to emit a microwave signal with the frequency f1 in 2.45 GHz band. The matching device 143 outputs a microwave signal which is oscillated at the frequency f1.

Although the configuration of the oscillator 111 has been described, the oscillator 112 similarly has the resonator 141, the negative resistive element 142, and the matching device 143. In the oscillator 112, the resonator 141 outputs a microwave signal which resonates at the frequency f2 to the negative resistive element 142, and the microwave signal which is oscillated at the frequency f2 is outputted from the matching device 143.

Figure 7:
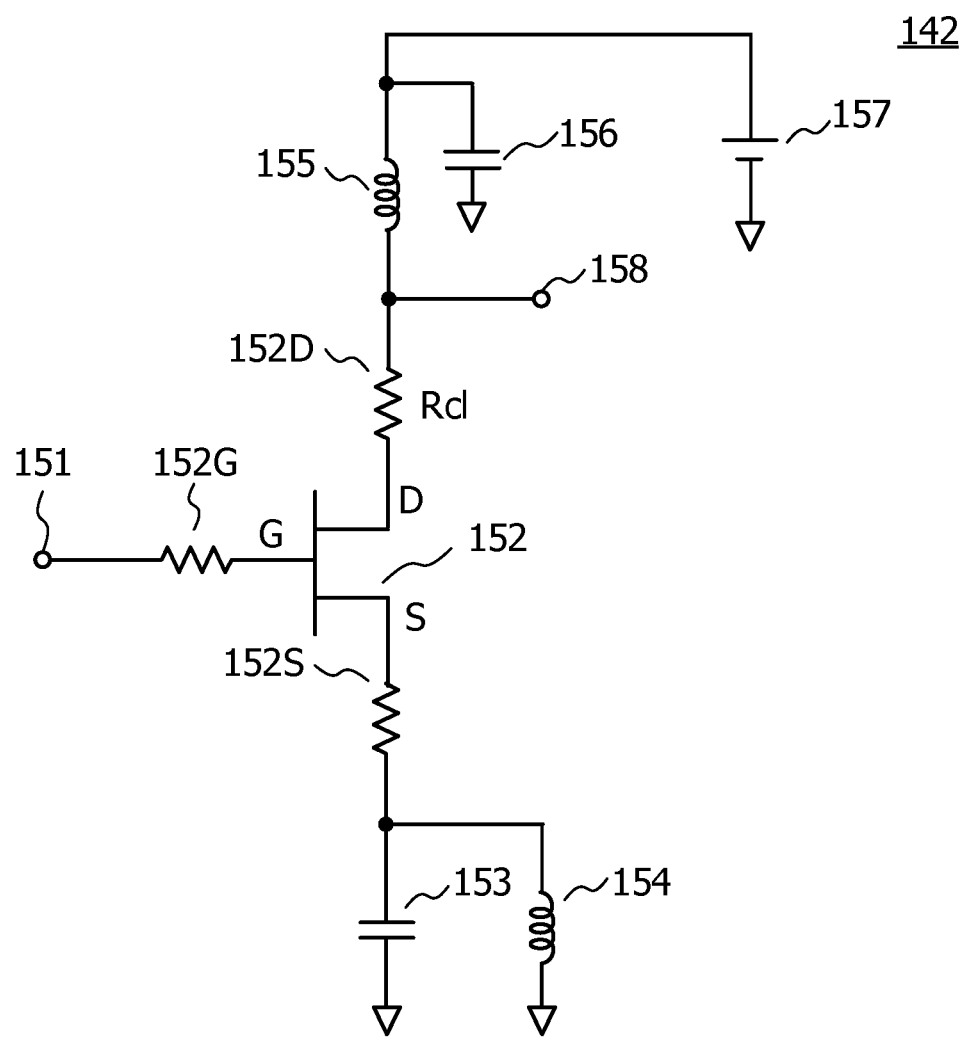
FIG. 7 is a diagram illustrating the circuit configuration of negative resistive element.

FIG. 7 is a diagram illustrating the circuit configuration of the negative resistive element 142. The negative resistive element 142 is a circuit implemented by a negative impedance converter (NIC). The negative resistive element 142 included in the oscillator 111 will be described with reference to FIG. 7.

The negative resistive element 142 has an input terminal 151, a transistor 152, resistors 152G, 152D, and 152S, a capacitor 153, a coil 154, a coil 155, a capacitor 156, a DC power supply 157, and an output terminal 158.

The negative resistive element 142 is a circuit having a negative (minus) apparent resistance and a reflective resistance higher than 1. The negative resistive element 142 is provided to emit a microwave signal which resonates at the frequency f1 in the resonator 141.

The input terminal 151 is connected to the resonator 141 as the input terminal 142A (see FIG. 6) of the negative resistive element 142, and a microwave signal with the frequency f1 is inputted to the input terminal 151. The input terminal 151 is connected to the gate terminal of the transistor 152 via the resistor 152G inside the negative resistive element 142.

The transistor 152 is an N-channel type metal-oxide-semiconductor field-effect transistor (MOSFET) having a gate terminal, a drain terminal, and a source terminal. The gate terminal is connected to the input terminal 151 via the resistor 152G, the drain terminal is connected to the coil 155 via the resistor 152D, and the source terminal is connected to the capacitor 153 and the coil 154 via the resistor 152S. The transistor 152 forms an oscillator circuit that oscillates a microwave signal.

The resistors 152G, 152D, and 152S are connected to the gate terminal, the drain terminal, and the source terminal, respectively, of the transistor 152, and represent the gate resistance, the drain resistance, and the source resistance of the transistor 152 as the resistors.

The capacitor 153 is connected to the coil 154 in parallel, one end of the capacitor 153 is connected to the source terminal of the transistor 152 via the resistor 152S, and the other end is grounded. The capacitor 153 has an electrostatic capacitance in which positive feedback at the frequency f1 is applied to the output from the output terminal 158 for the input to the input terminal 151 in the amplification function of the transistor 152.

The coil 154 is connected to the capacitor 153 in parallel, one end of the coil 154 is connected to the source terminal of the transistor 152 via the resistor 152S, and the other end is grounded. The coil 154 is provided as a path for DC current component outputted from the source terminal of the transistor 152.

The inductance of the coil 154 is set to a sufficiently high inductance so that resonance at the frequency f1 does not occur in the capacitor 153 and the coil 154 due to a relationship with the electrostatic capacitance of the capacitor 153.

One end of the coil 155 is connected to the drain of the transistor 152 via the resistor 152D, and the other end is connected to one electrode of the capacitor 156 and the positive (+) terminal of the DC power supply 157. The coil 155 is provided between the DC power supply 157 and the transistor 152 in order to block microwave signals.

The capacitor 156 is connected between the other end of the coil 155 and the ground potential point. The capacitor 156 is provided to remove components of microwave signals which flow through the transistor 152, the components being unable to be blocked by the coil 155.

The DC power supply 157 is connected between the other end of the coil 155 and the ground potential point. The DC power supply 157 is provided to apply a desired DC bias to the drain terminal of the transistor 152.

The output terminal 158 is connected to a point to branch from the point between the resistor 152D and the coil 155. The output terminal 158 is connected to the matching device 143 as the output terminal 142B (see FIG. 6) of the negative resistive element 142, and oscillates a microwave signal with the frequency f1 in 2.45 GHz band.

Figure 8:
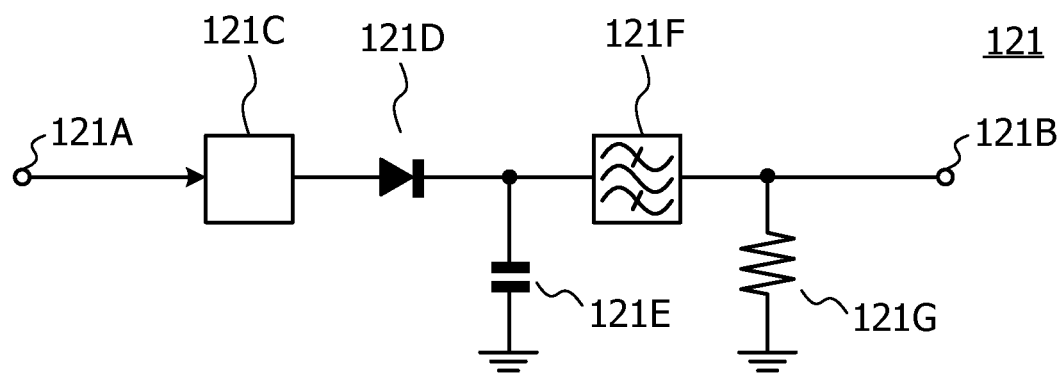
FIG. 8 is a diagram illustrating the configuration of a wave detector.

FIG. 8 is a diagram illustrating the configuration of the wave detector 121. The wave detector 121 has the input terminal 121A, the output terminal 121B, a matching device 121C, a diode 121D, a capacitor 121E, a LPF 121F, and a resistor 121G. Among these, the input terminal 121A and the output terminal 121B are connected to the antenna 102 and the voltmeter 122 (see FIG. 2).

The input terminal 121A is connected to the input terminal of the matching device 121C. The matching device 121C is provided to achieve impedance matching between the antenna 102 and the diode 121D and subsequent elements.

The anode of the diode 121D is connected to the matching device 121C, and the cathode of the diode 121D is connected to the capacitor 121E and the LPF 121F. The diode 121D allows only the positive component of a voltage to pass through to perform half-wave rectification and output the voltage which represents the envelope of the two-tone signal received by the antenna 102, and inputted via the matching device 121C.

The capacitor 121E is a smoothing capacitor which is connected in series between the cathode of the diode 121D, the connection point with the LPF 121F, and the ground potential point.

The LPF 121F allows the component of a voltage with a predetermined cutoff frequency or low to pass through, the voltage being half-wave rectified by the diode 121D, and smoothed by the capacitor 121E. It is sufficient that the cutoff frequency be slightly higher than the frequency of the envelope, thus when a microwave signal has a frequency of 2.45 GHz, the cutoff frequency may be set to 10 kHz, as an example.

The resistor 121G is inserted in series between the output terminal of the LPF 121F, a connection point with the output terminal 121B, and the ground potential point. The resistor 121G is a resistor provided on the output side of the LPF 121F.

The detector 121 described above detects the envelope of the two-tone signal received by the antenna 102, and outputs a time varying voltage value which represents the envelope.

The voltage value, which is outputted from the output terminal 121B and represents the envelope, is detected by the voltmeter 122.

Figure 9A:
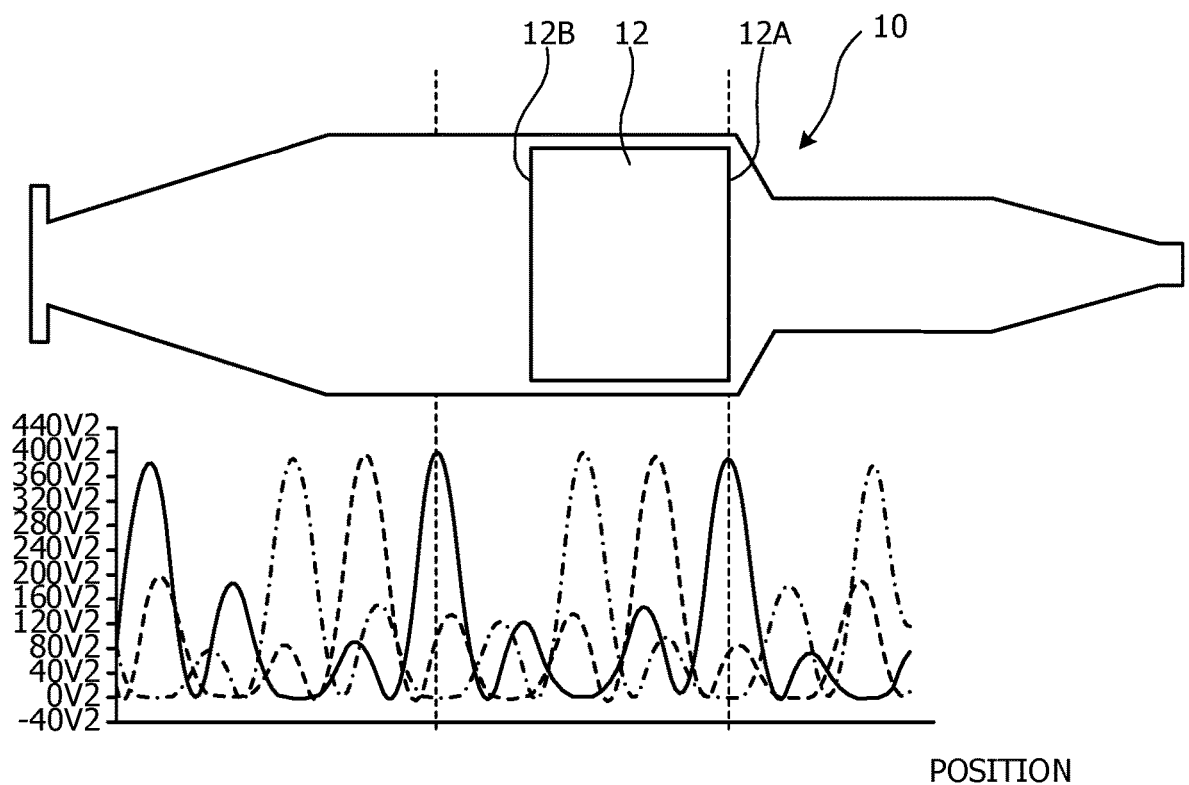
FIGS. 9A and 9B are views illustrating the electric field distribution generated in the filter device.
Figure 9B:
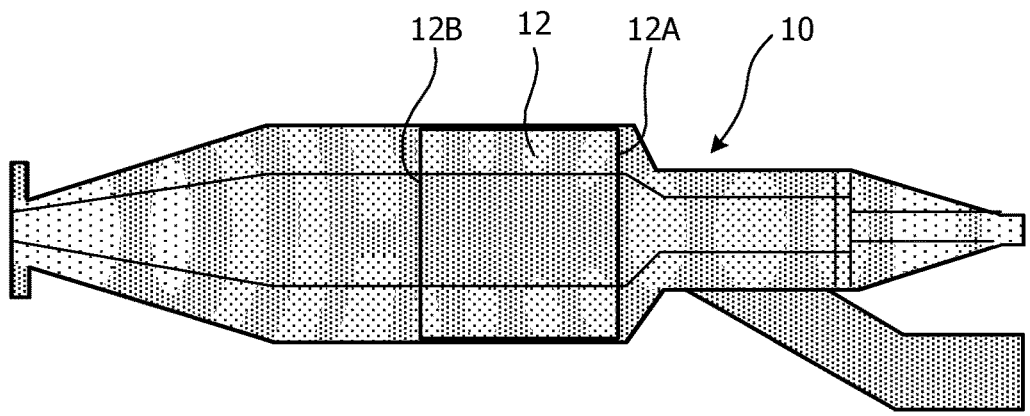

FIGS. 9A and 9B are views illustrating the electric field distribution generated in the filter device 10. FIG. 9A illustrates an electric field distribution (electric field level of the envelope) when the clogging determination device 100 emits a two-tone signal from the antenna 101, and FIG. 9B illustrates an electric field distribution when a 2.45-GHz microwave signal is emitted from the antenna 101 as a comparison. The electric field distribution of FIG. 9B is obtained by emitting a 2.45-GHz microwave signal not a two-tone signal from the antenna 101. FIGS. 9A and 9B illustrate the contour of the filter device 10 and the filter 12 in a simplified manner. In FIG. 9B, an electric field distribution is represented by shading. In the contour of the filter 12, a lighter color indicates a stronger electric field, and a darker color (black) indicates a weaker electric field. The electric field distributions illustrated in FIGS. 9A and 9B are obtained by electromagnetic simulation.

FIG. 9A illustrates the waveforms of three two-tone signals obtained when the amount of phase shift applied to a microwave signal with the frequency f2 by the phase shifter 113 is changed in three steps.

In the two-tone signal illustrated with a solid line, the peak of the envelope is located at the end 12A of the filter 12. In the two-tone signal illustrated with a dashed line, the peak position of the envelope is closer to the end 12B, as compared with the two-tone signal illustrated with a solid line, and the peak of the envelope of the two-tone signal illustrated with a dashed dotted line is further closer to the end 12B.

In this manner, the amount of phase shift applied to a microwave signal with the frequency f2 by the phase shifter 113 is changed in three steps, thus it is possible to move one peak position of the envelope of the two-tone signal from the end 12A to the end 12B of the filter 12.

Thus, when the voltage value of the envelope, received by the antenna 102 at a predetermined time interval is detected by a voltmeter, voltage data is collected by the data collection unit 133, and the voltage data is compared with a predetermined threshold by the determination unit 134, it is possible to recognize the degree of clogging between the end 12A and the end 12B of the filter 12.

A lower voltage value of the envelope, received by the antenna 102 indicates that the filter 12 is clogged, and the degree of clogging is higher. A predetermined threshold used by the determination unit 134 for determination may be set to a predetermined proportion (for instance, 60%) of the voltage value of a two-tone signal emitted from the antenna 101 to the filter device 10.

With this setting, when the voltage value of the envelope received by the antenna 102 falls below a predetermined proportion (for instance, 60%) of the voltage value of a two-tone signal emitted from the antenna 101 to the filter device 10, it is possible for the determination unit 134 to determine that clogging of the filter 12 has occurred.

The electric field distribution for comparison illustrated in FIG. 9B is obtained by emitting a 2.45 GHz microwave signal not a two-tone signal from the antenna 101 to the inside of the filter device 10.

Even when 2.45 GHz resonance occurs in the filter 12, there exist multiple resonance antinodes which are present in light-colored portions, and it is difficult to appropriately move the positions of antinodes from the end 12A to the end 12B of the filter 12. Thus, it is difficult to recognize the degree of clogging between the end 12A and the end 12B of the filter 12.

Figure 10A:
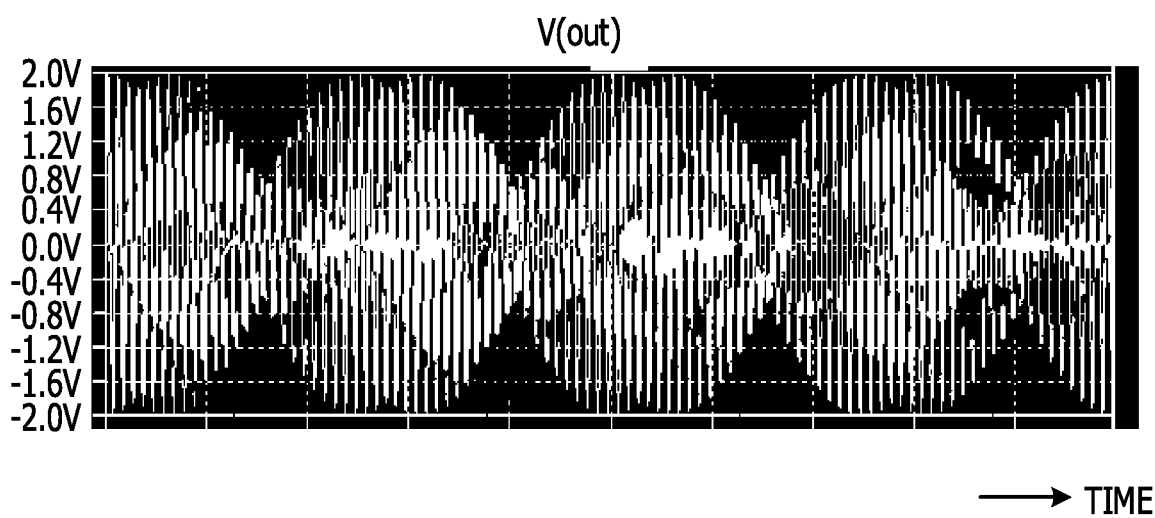
FIGS. 10A and 10B are graphs illustrating a two-tone signal outputted from the clogging determination device, and the envelope of the two-tone signal.
Figure 10B:
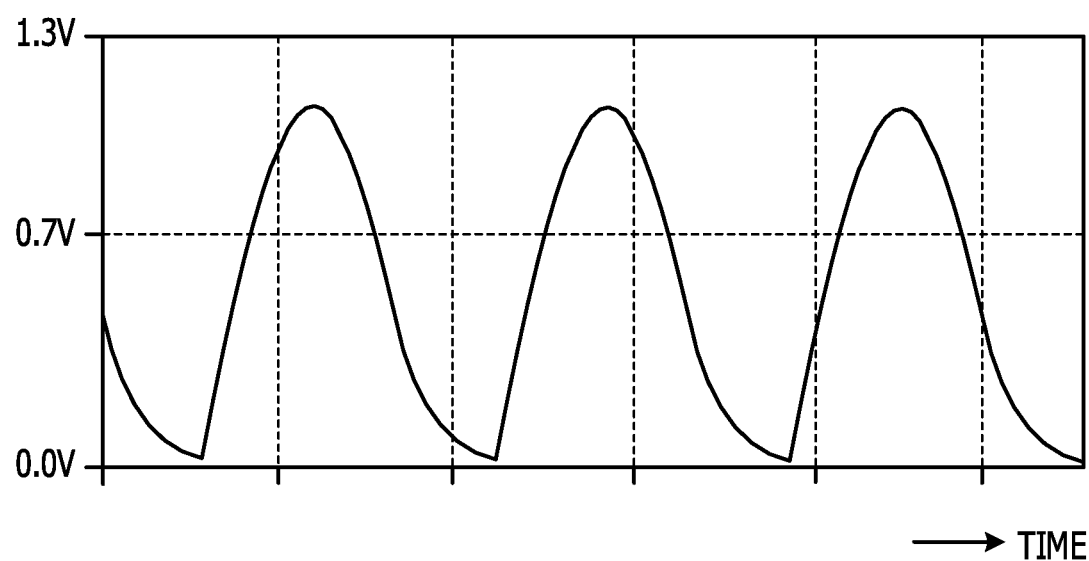

FIGS. 10A and 10B are graphs illustrating a two-tone signal outputted from the clogging determination device 100, and the envelope of the two-tone signal.

As illustrated in FIG. 10A, the amplitude changes according to the envelope at an approximately 10 kHz or low while the two-tone signal is oscillating at a frequency of approximately 2.45 GHz. When the envelope of such a two-tone signal is detected by the wave detector 121, the waveform of the envelope as illustrated in FIG. 10B is obtained.

According to the first embodiment described above, a two-tone signal is emitted from the antenna 101 to the inside of the filter device 10, and the voltage value of the envelope received by the antenna 102 is detected while the peak position of the envelope of the two-tone signal is being moved from the end 12A to the end 12B of the filter 12.

For example, when the frequency of the two-tone signal is set according to the length of the filter 12 from the end 12A to the end 12B so that one peak of the envelope is located between the end 12A and the end 12B, it is possible to easily detect occurrence of clogging and the position of the occurrence based on the voltage value of the envelope received by the antenna 102.

Consequently, it is possible to provide the clogging determination device 100 in a simple configuration.

In order to enable the position of clogging in the filter 12 to be identified, in a state where the amount of phase shift provided by the phase shifter 113 is adjusted so that the peak of the two-tone signal is located at the identified position, the processing unit 135 increases the output of the oscillators 111 and 112, thereby making it possible to break down the particulate matter which causes the clogging. Thus, it is also possible for the clogging determination device 100 to perform resume processing for the filter 12. The clogging determination device 100 like this may also be regarded as a resume processing device.

The embodiment has been described above, in which the frequency of the two-tone signal is set according to the length of the filter 12 from the end 12A to the end 12B so that one peak of the envelope is located between the end 12A and the end 12B.

However, multiple peaks of the envelope may be located between the end 12A and the end 12B of the filter 12. When the positional relationship between the multiple peaks of the envelope is recognized, occurrence of clogging at least one of the multiple peaks positions is detectable based on the voltage value of the envelope received by the antenna 102. The position at which clogging has occurred is at least one of the multiple peaks positions. The position at which clogging has occurred may be identified in this manner.

The embodiment has been described above, in which the peak position of the envelope of the two-tone signal is moved in the axial direction of the filter 12, and occurrence of clogging is determined at 11 locations. However, occurrence of clogging may be determined continuously from the end 12A to the end 12B of the filter 12 while the peak position of the envelope of the two-tone signal is being moved in the axial direction in the filter 12 based on the signal level of a reception signal obtained by the detection device 120.

The embodiment has been described above, in which the antennas 101, 102 are disposed on the downstream side and upstream side, respectively, of the filter 12 in the case 11.

The antennas 101, 102 may be disposed on the upstream side and downstream side, respectively, of the filter 12 in the case 11.

Although the embodiment has been described above, in which the phase of a microwave signal with the frequency f2 outputted from the oscillator 112 is shifted by the phase shifter 113, a two-tone signal may be composited by shifting the phase of a microwave signal with the frequency f1 outputted from the oscillator 111 using the phase shifter 113.

Second Embodiment

Figure 11:
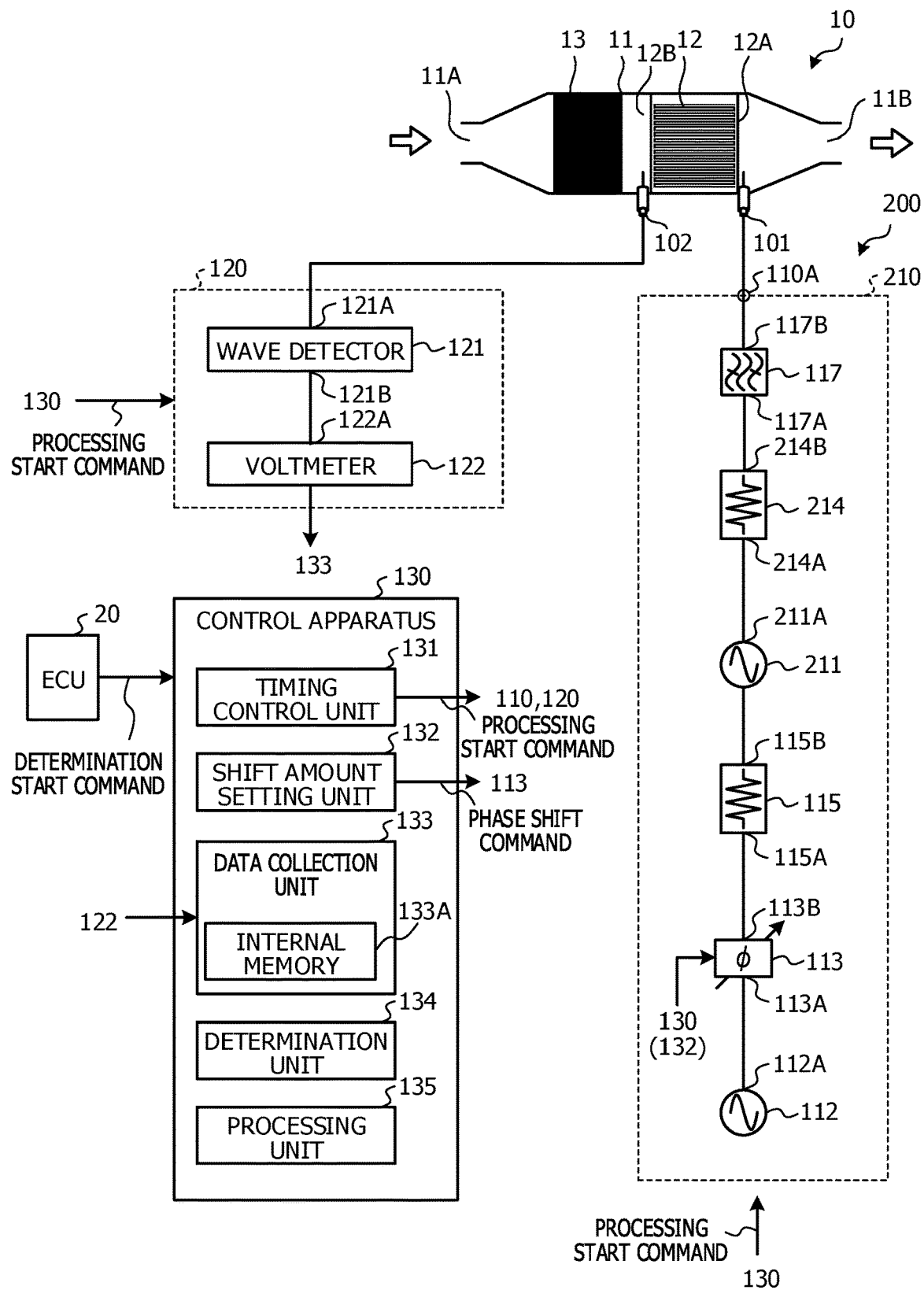
FIG. 11 is a diagram illustrating a clogging determination device 200, the filter device, and the ECU in a second embodiment.

FIG. 11 is a diagram illustrating a clogging determination device 200, the filter device 10, and the ECU 20 in a second embodiment. The clogging determination device 200 is mounted in a vehicle equipped with the filter device 10 and the ECU 20.

The clogging determination device 200 includes the antennas 101, 102, a signal generation unit 210, the detection device 120, and the control device 130. The clogging determination device 200 has a configuration in which the signal generation unit 110 of the clogging determination device 100 in the first embodiment is replaced by the signal generation unit 210. Thus, the points of difference will be mainly described below. The same components as in the clogging determination device 100 in the first embodiment are labeled with the same symbol, and a description thereof is omitted.

The signal generation unit 210 includes an output terminal 110A, oscillators 211, 112, a phase shifter 113, attenuation units 214, 115, and a BPF 117. The signal generation unit 210 has a configuration in which the mixer 116 is removed from the signal generation unit 110 in the first embodiment, and the oscillators 211 and 112 are connected in series.

On the output side of the attenuation unit 115, the oscillator 211, the attenuation unit 214, and the BPF 117 are connected in series.

The oscillator 211 has an input terminal 211A and an output terminal 211B. The oscillator 211 is an injection oscillator, and provided between the attenuation unit 115 and the attenuation unit 214. The oscillator 211 is an example of a first injection oscillator. The input terminal 211A is connected to the output terminal 115B of the attenuation unit 115, and the output terminal 211B is connected to the input terminal 214A of the attenuation unit 214.

The oscillator 211 outputs a two-tone signal which is obtained by compositing a microwave signal with the frequency f2 in 2.45 GHz band inputted from the oscillator 112, and a microwave signal with the frequency f1 in 2.45 GHz band generated internally by the oscillator 211. The detailed configuration of the oscillator 211 will be described later with reference to FIG. 12.

The attenuation unit 214 has an input terminal 214A and an output terminal 214B. The input terminal 214A is connected to the output terminal 211B of the oscillator 211, and the output terminal 214B is connected to the input terminal 117A of the BPF 117.

The attenuation unit 214 is provided to attenuate the signal level of a microwave signal (two-tone signal) oscillated by the oscillator 211 to a predetermined appropriate level, as well as to terminate the characteristic impedance between the oscillator 211 and the BPF 117 to 50Ω. The attenuation unit 214 is, for instance, an attenuator.

The input terminal 117A of the BPF 117 is connected to the output terminal 214B of the attenuation unit 214, and the output terminal 117B is connected to the antenna 101. The BPF 117 has a passband which removes spurious noise from the signal inputted by the attenuation unit 214 and allows the two-tone signal to pass through.

The signal generation unit 210 as described above moves the peak position of the envelope of the two-tone signal emitted to the filter 12 from the antenna 101 in the axial direction in the filter 12 by changing one of the phases of the two signals. The manner in which the peak position of the envelope is moved is the same as in the first embodiment.

Figure 12:
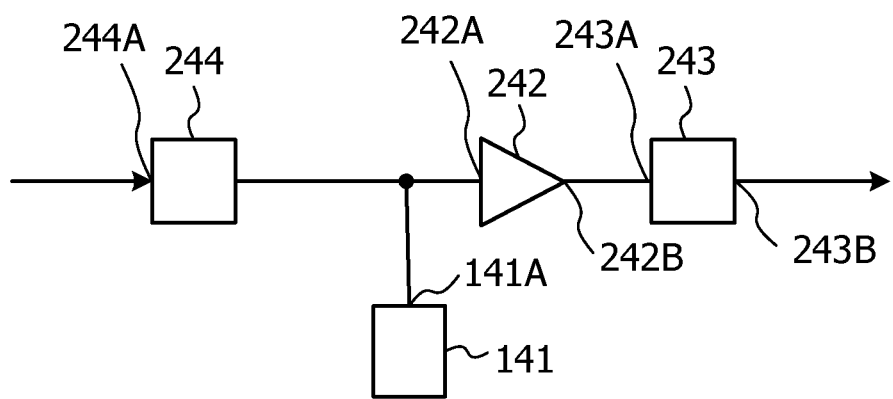
FIG. 12 is a diagram illustrating the configuration of an oscillator.

FIG. 12 is a diagram illustrating the configuration of the oscillator 211. The oscillator 211 has the resonator 141, a negative resistive element 242, a matching device 243, and a coupler 244. The same components of the oscillator 211 as the components of the oscillator 111 in the first embodiment are labeled with the same symbol, and a description thereof is omitted.

The coupler 244 has an input terminal 244A and an output terminal 244B. The input terminal 244A is connected to the output terminal 115B of the attenuation unit 115 as the input terminal 211A (see FIG. 11) of the oscillator 211, and the output terminal 244B is connected to an input terminal 242A of the negative resistive element 242. The coupler 244 is connected to the input terminal 242A of the negative resistive element 242 in parallel with the resonator 141.

The coupler 244 is implemented by a capacitor, and inputs a microwave signal with the frequency f2 inputted via the attenuation unit 115 to the negative resistive element 242.

The negative resistive element 242 has an input terminal 242A and an output terminal 242B. The negative resistive element 242 is an element having a negative (minus) apparent resistance for a voltage inputted to the input terminal 242A, and is implemented by a NIC. The negative resistive element 242 oscillates a microwave signal which resonates at the frequency f1 in the resonator 141.

The negative resistive element 242 receives input of a microwave signal which oscillates at the frequency f2 via the coupler 244, and a microwave signal which resonates at the frequency f1 from the resonator 141. For example, the negative resistive element 242 oscillates a microwave signal with the frequency f1, and composites a microwave signal which oscillates at the frequency f1 and a microwave signal which oscillates at the frequency f2 to output a two-tone signal to the matching device 243.

The matching device 243 has an input terminal 243A and an output terminal 243B. The input terminal 243A is connected to the output terminal 242B of the negative resistive element 242, and the output terminal 243B is connected to the input terminal 114A of the attenuation unit 114 as the output terminal 211B of the oscillator 211.

The matching device 243 is a circuit that terminates the characteristic impedance of the output terminal 211B of the oscillator 211 to 50Ω, and achieves impedance matching to enable the oscillator 211 to output a two-tone signal. The matching device 243 outputs a two-tone signal in 2.45 GHz band.

According to the second embodiment described above, similarly to the first embodiment, a two-tone signal is emitted from the antenna 101 to the inside of the filter device 10, and the voltage value of the envelope received by the antenna 102 is detected while the peak position of the envelope of the two-tone signal is being moved from the end 12A to the end 12B of the filter 12.

For example, when the frequency of the two-tone signal is set according to the length of the filter 12 from the end 12A to the end 12B so that one peak of the envelope is located between the end 12A and the end 12B, it is possible to easily detect occurrence of clogging and the position of the occurrence based on the voltage value of the envelope received by the antenna 102.

Consequently, it is possible to provide the clogging determination device 200 in a simple configuration.

The processing unit 135 increases the output of the oscillators 211 and 112, thereby making it possible to break down the particulate matter which causes clogging, and to perform resume processing for the filter device 10. The clogging determination device 200 like this may also be regarded as a resume processing device.

Third Embodiment

Figure 13:
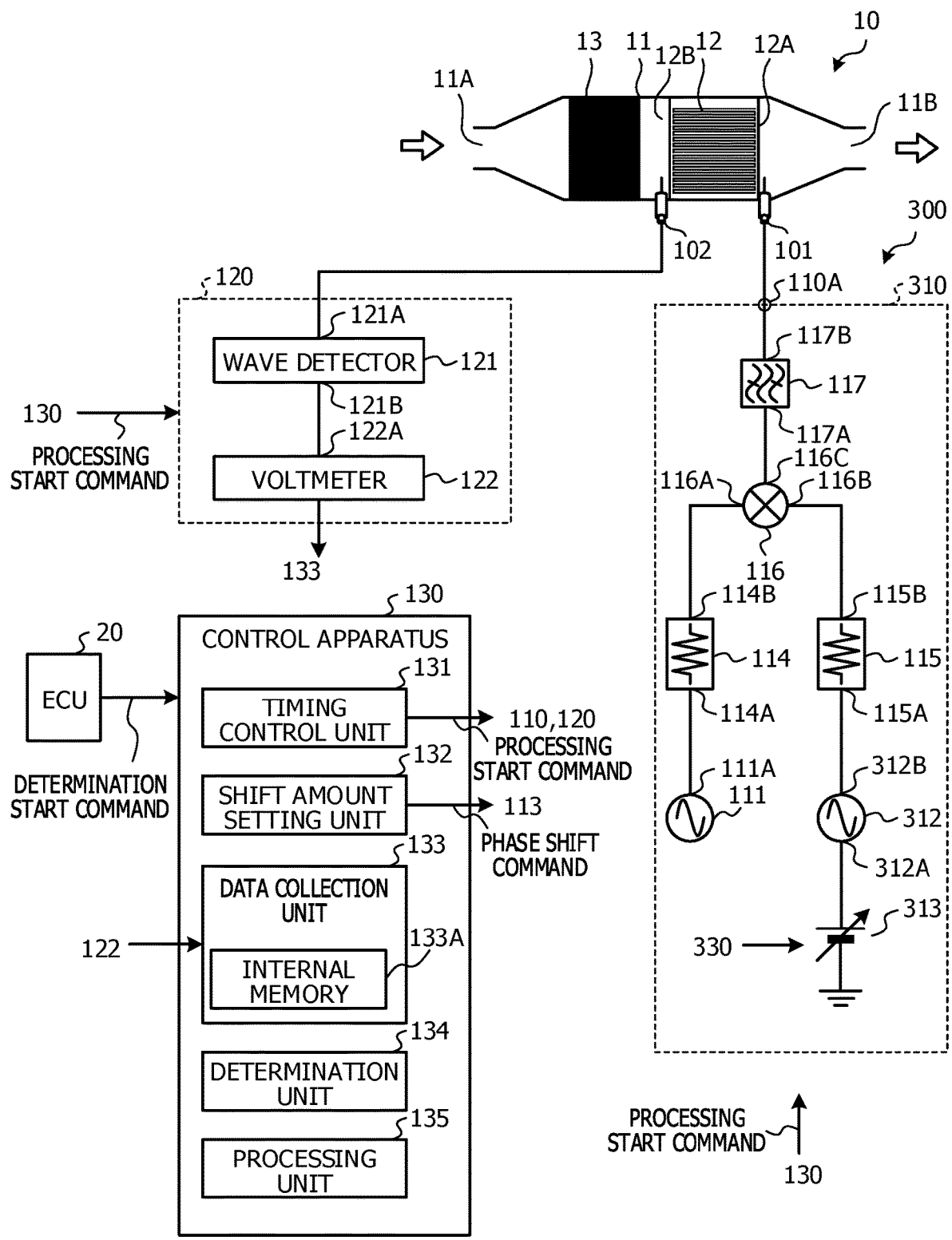
FIG. 13 is a diagram illustrating a clogging determination device, the filter device 10, and the ECU in a third embodiment.

FIG. 13 is a diagram illustrating a clogging determination device 300, the filter device 10, and the ECU 20 in a third embodiment. The clogging determination device 300 is mounted in a vehicle equipped with the filter device 10 and the ECU 20.

The clogging determination device 300 includes the antennas 101, 102, a signal generation unit 310, the detection device 120, and a control device 330. The clogging determination device 300 has a configuration in which the signal generation unit 110 and the control device 130 of the clogging determination device 100 in the first embodiment are replaced by the signal generation unit 310 and the control device 330. Thus, the points of difference will be mainly described below. The same components as in the clogging determination device 100 in the first embodiment are labeled with the same symbol, and a description thereof is omitted.

The signal generation unit 310 includes the output terminal 110A, oscillators 111, 312, a variable DC power supply 313, the attenuation units 114, 115, the mixer 116, and the BPF 117. The clogging determination device 300 has a configuration in which the phase shifter 113 is removed from the signal generation unit 110 in the first embodiment, the variable DC power supply 313 is added, and the oscillator 112 is replaced by the oscillator 312.

On the input side of the attenuation unit 115, the oscillator 312 and the variable DC power supply 313 are connected in series.

The oscillator 312 has an input terminal 312A and an output terminal 312B, and is provided between the variable DC power supply 313 and the attenuation unit 115. The input terminal 312A is connected to the positive (+) terminal of the variable DC power supply 313, and the output terminal 312B is connected to the input terminal 115A of the attenuation unit 115.

The oscillator 312 outputs a microwave signal with the frequency f2 to the attenuation unit 115. The oscillator 312 is capable of performing variable control (shift control) on the frequency f2. In the third embodiment, instead of moving the peak position of the envelope of the two-tone signal by shifting the phase of the microwave signal with the frequency f2 as in the first and second embodiments, the peak position of the envelope of the two-tone signal is moved by shifting the frequency f2.

The variable DC power supply 313 is provided between the ground potential point and the oscillator 312. The negative (−) terminal of the variable DC power supply 313 is connected to the ground potential point, and the positive (+) terminal is connected to the input terminal of the oscillator 312. The variable DC power supply 313 is provided to shift the frequency f2 of the microwave signal oscillated by the oscillator 312.

The control device 330 has a timing control unit 331, a frequency control unit 332, the data collection unit 133, the determination unit 134, and the processing unit 135. When a determination start command is inputted from the ECU 20, the control device 330 starts processing to determine a degree of clogging of the filter 12.

The control device 330 has a configuration in which the timing control unit 331 and the shift amount setting unit 132 of the control device 130 in the first and second embodiments are replaced by the timing control unit 331 and the frequency control unit 332.

The timing control unit 331 differs from the timing control unit 131 in the first and second embodiments in that timing control unit 331 transmits an output command for outputting a frequency shift command to the frequency control unit 332, whereas the timing control unit 131 transmits an output command for outputting a phase shift command to the shift amount setting unit 132 each time a predetermined time elapses since the transmission of a processing start command.

When a processing start command is received or an output command is received from the timing control unit 331, the frequency control unit 332 outputs a frequency shift command to the phase shifter 113. The frequency shift command is a command to instruct the variable DC power supply 313 to change the output voltage. In the third embodiment, the frequency f2 of the microwave signal oscillated by the oscillator 312 is shifted by causing the variable DC power supply 313 to change the output voltage.

The signal generation unit 310 as described above moves the peak position of the envelope of the two-tone signal emitted to the filter 12 from the antenna 101 in the axial direction in the filter 12 by changing one of the frequencies of the two signals. The manner in which the peak position of the envelope is moved is the same as in the first and second embodiments.

Figure 14:
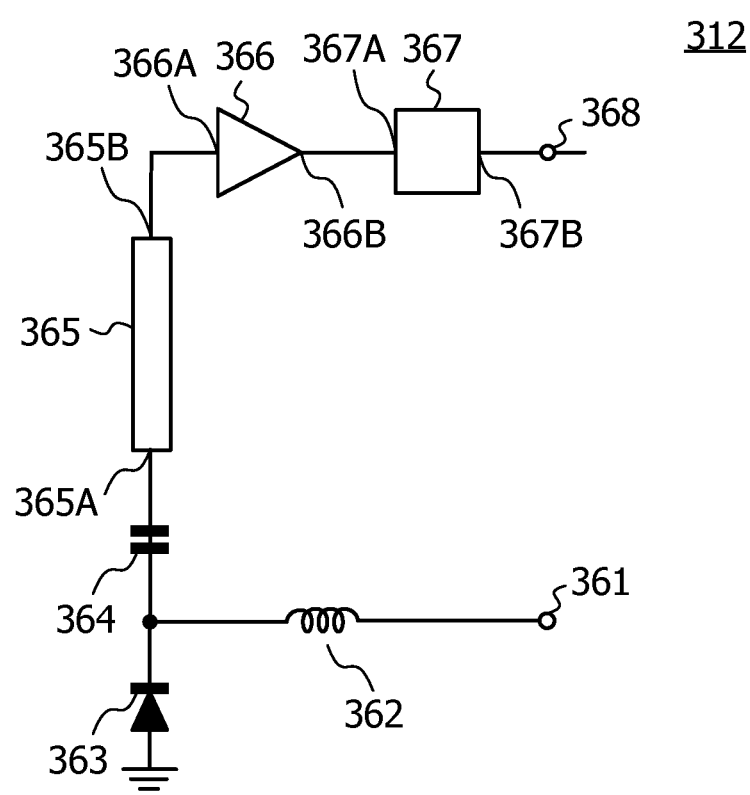
FIG. 14 is a diagram illustrating the configuration of an oscillator.

FIG. 14 is a diagram illustrating the configuration of the oscillator 312. The oscillator 312 has an input terminal 361, a coil 362, a varactor diode 363, a capacitor 364, a distributed constant line 365, a negative resistive element 366, a matching device 367, and an output terminal 368.

The input terminal 361 is a terminal to which the positive (+) terminal of the variable DC power supply 313 is connected, the terminal serving as the input terminal 312A of the oscillator 312.

The coil 362 is connected between the input terminal 361, and the connection point of one end of the capacitor 364 and the cathode of the varactor diode 363. The coil 362 is provided to allow DC power inputted from the variable DC power supply 313 to pass through, and to block microwave signals. A DC voltage applied from the variable DC power supply 313 via the coil 362 changes the DC component of the potential of the cathode of the varactor diode 363.

The varactor diode 363 is provided between the ground potential point and the connection point of the coil 362 and the capacitor 364. The varactor diode 363 is an element having a variable electrostatic capacitance. The electrostatic capacitance of the varactor diode 363 is controlled by the DC voltage applied from the variable DC power supply 313 via the coil 362.

When the DC voltage outputted by the variable DC power supply 313 changes, the DC component of the potential of the cathode of the varactor diode 363 is changed, and thus the electrostatic capacitance of the varactor diode 363 is changed.

The varactor diode 363 is provided to adjust the line length (electrical length) of the distributed constant line 365.

Among those elements, the varactor diode 363, the capacitor 364, and the distributed constant line 365 constitute a resonator.

The capacitor 364 is connected in series between the connection point of the coil 362 and the capacitor 364, and the distributed constant line 365. The capacitor 364 is provided to block DC power from the connection point of the coil 362 and the capacitor 364, and to allow an AC component from the distributed constant line 365 to pass through.

The distributed constant line 365 has terminals 365A and 365B. The terminal 365A is connected to one (the upper side of FIG. 14) of the terminals of the capacitor 364, and the terminal 365B is connected to an input terminal 366A of the negative resistive element 366.

The distributed constant line 365 is a transmission line that has an electrical length of ¼ (λ/4) of the wavelength λ of the frequency f2 so that the microwave signal, which is reflected by the input terminal 366A of the negative resistive element 366 and inputted to the distributed constant line 365, is returned to the input terminal 366A of the negative resistive element 366 with the same phase. The characteristic impedance of the distributed constant line 365 is 50Ω. The distributed constant line 365 functions as a resonator that resonates at the frequency f2.

The negative resistive element 366 has an input terminal 366A and an output terminal 366B. The negative resistive element 366 is an element having a negative (minus) apparent resistance for a voltage inputted to the input terminal 366A, and is implemented by a NIC. The negative resistive element 366 oscillates a microwave signal which resonates at the frequency f2 in the distributed constant line 365.

The matching device 367 has an input terminal 367A and an output terminal 367B. The input terminal 367A is connected to the output terminal 3668 of the negative resistive element 366.

The matching device 367 is a circuit that terminates the characteristic impedance of the output terminal 312B of the oscillator 312 to 50Ω, and achieves impedance matching to enable the oscillator 312 to emit a microwave signal with the frequency f2 in 2.45 GHz band. The matching device 367 outputs a microwave signal which is oscillated at the frequency f2.

The output terminal 368 is connected to the input terminal 115A of the attenuation unit 115 as the output terminal 312B of the oscillator 312.

When change in the DC voltage outputted by the variable DC power supply 313 causes the electrostatic capacitance of the varactor diode 363 to change, the line length (electrical length) of the distributed constant line 365 is changed, thus the frequency f2 of a microwave signal which resonates in the distributed constant line 365 changes. In this manner, the oscillator 312 changes (shifts) the frequency f2 of an oscillated microwave signal.

The change (shift) in the frequency f2 of a microwave signal oscillated by the oscillator 312 causes a change in the waveform of the envelope of a two-tone signal composited by the mixer 116, and thus it is possible to change the peak position of the envelope between the end 12A and the end 12B of the filter 12.

Thus, in the third embodiment, similarly to the first and second embodiments, it is possible to determine whether clogging of the filter 12 has occurred by moving the peak position of the envelope of the two-tone signal in the filter 12.

According to the third embodiment, similarly to the first embodiment, a two-tone signal is emitted from the antenna 101 to the inside of the filter device 10, and the voltage value of the envelope received by the antenna 102 is detected while the peak position of the envelope of the two-tone signal is being moved from the end 12A to the end 12B of the filter 12.

For example, when the frequency of the two-tone signal is set according to the length of the filter 12 from the end 12A to the end 12B so that one peak of the envelope is located between the end 12A and the end 12B, it is possible to easily detect occurrence of clogging and the position of the occurrence based on the voltage value of the envelope received by the antenna 102.

Consequently, it is possible to provide the clogging determination device 300 in a simple configuration.

The processing unit 135 increases the output of the oscillators 111 and 312, thereby making it possible to break down the particulate matter which causes clogging, and to perform resume processing for the filter device 10. The clogging determination device 300 like this may also be regarded as a resume processing device.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A clogging determination device comprising:
a first antenna disposed at one of a side of a first end and a side of a second end of a filter disposed internally of a case which serves as a flow path for an exhaust gas;
a second antenna disposed at the other of the side of the first end and the side of the second end of the filter;
a multi-tone signal generator that has an output terminal coupled to the first antenna, outputs from the output terminal a multi-tone signal obtained by compositing a plurality of signals having different frequencies, and moves a position of an envelope of the multi-tone signal emitted to the filter from the first antenna, in a direction of the flow path in the filter by changing a phase or a frequency of at least one of the plurality of signals;
a detector that is coupled to the second antenna, and detects an intensity of the multi-tone signal received by the second antenna; and
a determinator that determines a degree of clogging of the filter based on an intensity of the multi-tone signal outputted from the first antenna and the intensity of the multi-tone signal detected by the detector.

2. The clogging determination device according to claim 1,
wherein the multi-tone signal generator moves a position of a peak of the envelope in the direction of the flow path, and
when the position of the peak of the envelope is moved in the direction of the flow path by the multi-tone signal generator, the determinator determines a degree of clogging of the filter at a portion where the peak of the envelope is located, based on the intensity of the multi-tone signal outputted from the first antenna and the intensity of the multi-tone signal detected by the detector.

3. The clogging determination device according to claim 1, wherein frequencies of the plurality of signals are such that one peak of the envelope of the multi-tone signal falls between the first end and the second end in the direction of the flow path of the filter.

4. The clogging determination device according to claim 1, wherein the multi-tone signal generator includes:
a first oscillator that oscillates a first signal among the plurality of signals;
a second oscillator that oscillates a second signal among the plurality of signals;
a mixer that mixes the first signal oscillated from the first oscillator and the second signal oscillated from the second oscillator, and outputs the multi-tone signal to the output terminal; and
a phase shifter that is provided between the first oscillator or the second oscillator, and the mixer, and shifts a phase of the first signal or the second signal.

5. The clogging determination device according to claim 4, wherein the first oscillator and the second oscillator include:
a resonator; and
a negative resistive element coupled to an output side of the resonator.

6. The clogging determination device according to claim 1, wherein the multi-tone signal generator includes:
a second oscillator that oscillates a second signal among the plurality of signals;
a phase shifter that shifts a phase of the second signal oscillated by the second oscillator; and
a first injection oscillator that receives input of the second signal having the phase shifted by the phase shifter, composites a first signal among the plurality of signals, and the second signal having the phase shifted, and outputs the multi-tone signal to the output terminal.

7. The clogging determination device according to claim 6, wherein the first oscillator and the second oscillator include:
a resonator; and
a negative resistive element coupled to an output side of the resonator.

8. The clogging determination device according to claim 1, wherein the multi-tone signal generator includes:
a first oscillator that oscillates a first signal among the plurality of signals;
a second oscillator that performs variable control on a second signal among the plurality of signals, and oscillates the second signal;
a mixer that mixes the first signal oscillated from the first oscillator and the second signal oscillated from the second oscillator, and outputs the multi-tone signal to the output terminal.

9. The clogging determination device according to claim 8, wherein the first oscillator and the second oscillator include:
a resonator; and
a negative resistive element coupled to an output side of the resonator.

10. The clogging determination device according to claim 1, wherein the side of the first end is an upstream side of the filter in the direction of the flow path, and the side of the second end is a downstream side of the filter in the direction of the flow path, and
the first antenna is disposed on the downstream side which is the side of the second end of the filter.

11. The clogging determination device according to claim 1, further comprising
a removal processor that, when the determinator determines that the degree of clogging of the filter is greater than or equal to a predetermined degree, removes a foreign material which has clogged in the filter by increasing the intensity of the multi-tone signal.

* * * * *